US006218004B1

(12) United States Patent
Shaw et al.

(10) Patent No.: US 6,218,004 B1
(45) Date of Patent: *Apr. 17, 2001

(54) ACRYLATE POLYMER COATED SHEET MATERIALS AND METHOD OF PRODUCTION THEREOF

(76) Inventors: David G. Shaw, 1041 E. Calla Mariposa, Tucson, AZ (US) 85718; Eric Dawson, 8851 N. Oracle, Apt. #207, Tucson, AZ (US) 85737; Daniel Cline, 8851 N. Oracle, Apt. #413, Tucson, AZ (US) 85737; Marc Langlois, 4420 N. Camino de Carillo, Tucson, AZ (US) 85715

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/514,411

(22) Filed: Aug. 11, 1995

Related U.S. Application Data

(63) Continuation of application No. 08/417,604, filed on Apr. 6, 1995, now abandoned.

(51) Int. Cl.[7] .......................... B32B 15/08; D21H 19/08; D21H 19/16

(52) U.S. Cl. .......................... 428/336; 428/195; 428/463; 428/464; 428/510; 428/520

(58) Field of Search .................................... 428/441, 451, 428/461, 483, 195, 336, 463, 464, 510, 520

(56) References Cited

U.S. PATENT DOCUMENTS 3,463,659 8/1969 Dragoon et al. ...................... 117/71
4,177,310 12/1979 Steeves ............................... 428/216

(List continued on next page.)

FOREIGN PATENT DOCUMENTS 2052321 3/1992 (CA) .
176693 4/1986 (EP) .
340935 11/1989 (EP) .
WO 92/06243 4/1992 (WO) .
WO 95/10117 4/1995 (WO) .

OTHER PUBLICATIONS

Shaw, david G. t al., "Use of Vapor Deposited Acrylate Coatings to Improve the Barrier Properties of Metallized Film", Paper presented at the Society of Vacuum Coating, Boston, Massachusetts, 1994.

(List continued on next page.)

*Primary Examiner*—D. S. Nakarani
(74) *Attorney, Agent, or Firm*—Christie, Parker & Hale, LLP

(57) ABSTRACT

Sheet materials according to the present invention comprise a sheet material substrate, such as for example a film or paper sheet, with a polymer base coating overlying and adhered to a surface of the sheet material substrate. The base coating comprises a radiation cured crosslinked polymer derived from at least one vapor deposited acrylate prepolymer composition having a molecular weight in the range of from about 150 to 600. A metal layer is deposited on and overlies a surface of the base coating, and a polymer top coating overlies and is adhered to a surface of the metal layer. The top coating comprises a radiation cured crosslinked polymer derived from a vapor deposited acrylate prepolymer composition having a molecular weight in the range of from about 150 to 600 and a ratio of its molecular weight to its number of acrylate groups (MW/Ac) in the range of from about 150 to 600. According to one embodiment of the invention, metallized paper sheet materials are produced with superior appearance and performance characteristics which can be tailored to specific end use applications. For example, the metallized paper can be produced with a very shiny, high gloss surface appearance, and/or a high quality metallized layer free of defects or pinholes, and/or an outer surface which is highly receptive to printing.

51 Claims, 5 Drawing Sheets

U.S. PATENT DOCUMENTS

| | | | | |
|---|---|---|---|---|
| 4,201,808 | | 5/1980 | Cully et al. | 428/40 |
| 4,307,150 | * | 12/1981 | Roche | 428/336 |
| 4,490,774 | | 12/1984 | Olson et al. | 361/311 |
| 4,537,811 | | 8/1985 | Nablo | 428/166 |
| 4,647,818 | | 3/1987 | Ham | 315/111.21 |
| 4,696,719 | | 9/1987 | Bischoff | 202/205 |
| 4,789,604 | * | 12/1988 | van der Hoevan | 428/503 |
| 4,801,495 | * | 1/1989 | van der Hoeran | 428/286 |
| 4,842,893 | | 6/1989 | Yializis et al. | 427/44 |
| 4,954,371 | | 9/1990 | Yializis | 427/44 |
| 5,018,048 | | 5/1991 | Shaw et al. | 361/323 |
| 5,021,298 | | 6/1991 | Revell | 428/458 |
| 5,023,138 | | 6/1991 | McIntyre | 428/352 |
| 5,032,461 | | 7/1991 | Shaw et al. | 428/461 |
| 5,075,349 | | 12/1991 | Ohba et al. | 522/99 |
| 5,082,915 | | 1/1992 | Hara et al. | 528/15 |
| 5,084,354 | | 1/1992 | Krankkala et al. | 428/414 |
| 5,097,800 | | 3/1992 | Shaw et al. | 118/730 |
| 5,108,782 | | 4/1992 | Reed | 427/54.1 |
| 5,125,138 | | 6/1992 | Shaw et al. | 29/25.42 |
| 5,188,900 | * | 2/1993 | Revis et al. | 428/412 |
| 5,254,395 | * | 10/1993 | Hodnett, III | 428/217 |
| 5,436,073 | * | 7/1995 | Williams et al. | 428/343 |
| 5,440,446 | * | 8/1995 | Shaw et al. | 361/301.5 |
| 5,494,745 | * | 2/1996 | Velden et al. | 428/354 |

OTHER PUBLICATIONS

Shaw, David G. et al., "A New High Speed Process for Vapor Depositiong Acrylate Thin Films: An Update", Paper presented at the Society of Vacuum Coating, Dallas, Texas, 1993.

Wicks et al., *Organic Coatings: Science and Technology*, vol. II: Applications, Properties, and Performance, 1994, John Wiley & Sons, Inc., New York, Chapt. XXVI, "Adhesion," "26.1 Surface Mechanical Effects on Adhesion," pp. 153–156; "26.5 Adhesion to Plastics and Coatings," pp. 164–166; "26.6 Testing For Adhesion," pp. 166–168; References pp. 168–169.

* cited by examiner

ACRYLATE POLYMER COATED SHEET MATERIALS AND METHOD OF PRODUCTION THEREOF

CROSS REFERENCE TO RELATED APPLICATION

This application is a continuation of U.S. application Ser. No. 08/417,604 filed Apr. 6, 1995, now abandoned.

FIELD OF THE INVENTION

This invention relates generally to sheet materials having acrylate polymer coatings thereon and to methods of producing such sheet materials. Certain embodiments of the present invention relate more particularly to sheet materials, such as a metallized paper or film, having a metal layer or substrate and one or more acrylate polymer coatings and to methods of making the same.

BACKGROUND OF THE INVENTION

Metallized paper is used for decorative paper such as for gift wrappings, and for product identification purposes such as for beer labels, canned food labels and the like. Metallized paper is found to be desirable for such uses because of its glossy aluminized appearance and its related ability to attract the attention of a consumer. Metallized paper is usually printed with some sort of product identifier or some type of decorative figure and is made in varying degrees of gloss level and with various different performance characteristics. For example, gift wrap paper must be easily printable, it must be able to be folded without losing the metal coating, and it must usually have a high reflective finish. Beer labels, on the other hand, must be caustic removable to facilitate their removal during glass reclamation, it must hold up well in a wet environment, and it must also be quite abrasion resistant.

Most metallized paper is made by applying prepolymer and aluminum layers on clay-coated Kraft paper which is approximately 30 to 150 microns thick. The process usually involves applying one or two layers of solvent based prepolymer material and drying them in an oven to remove the solvent after each layer. This method provides a relatively smooth base coating on which an aluminum layer is deposited. The method of first coating the Kraft paper with prepolymer before depositing the aluminum layer is needed because the clay-coated paper is typically not smooth enough to achieve a shiny metallized finish without the smoothing prepolymer layers. After the prepolymer layers are cured, the aluminum is then applied in a vacuum metallizer. A solvent-based prepolymer top coating is applied to the aluminum layer and the solvent is evaporated in an oven. This solvent-based coating process involves at least three or four different steps, increasing the process cost and opportunity for manufacturing losses. Additionally, a very high gloss level cannot be obtained via the solvent-based coating process because of the handling and the solvent evaporation that creates a high density of pinholes in the coating surface, thereby providing a metallized paper having only a medium gloss level. Finally, the use of a solvent-based process is neither environmentally desirable, due to the release of volatile solvent vapors into the atmosphere, nor energy efficient, due to the use of an oven to evaporate the solvent after each layer.

An alternative process to metallize paper on a much more limited basis involves applying an initial smoothing prepolymer layer by using a gravure coating method and curing the layers with a high voltage (150–300 KV) electron beam. The substrate paper is then metallized with a layer of aluminum. A top coat of prepolymer material is applied to the aluminum layer using the gravure method and is cured again using a high voltage electron beam. High voltage electron beams are used because the electron beams are generated inside of a sealed system and they must have enough accelerating voltage to enable them to penetrate through a foil window, through an air layer, and through the coating process. The prepolymer materials that are used in such alternative process are acrylate blends of monomers and oligomers.

The gravure coated acrylate/high voltage electron beam process is more environmentally desirable and energy efficient than the solvent-based coating. Additionally, the gravure process results in a metallized paper coating having improved surface gloss over the solvent-based coating level. The coating is quite sensitive to the wetting of the substrate and the inclusion of bubbles in the coating, ultimately resulting in the formation of pinholes in the surface of the coating. Although the pinhole density associated with the gravure coated process is less than that of the solvent-based process, the ability to obtain a high gloss surface finish is still adversely affected.

The gravure coating process also requires three different process steps and the use of a high voltage electron beam to cure the polymer layer. The use of such high-voltage electron beam not only penetrates the coating layer but penetrates the paper and embrittles it, increasing the probability that the substrate will tear when folded. This curing system is also inefficient because it deposits most of the electron beam energy in the substrate and not in the coating.

It is, therefore, desirable that a metallized paper product and, method for producing the same, be developed that displays a high gloss level without pinholes by using a process having a minimum number of steps. It is desirable that the metallized paper experience no embrittling during the curing process. It is desirable that the coating have excellent adhesion to the paper, have excellent inter-layer adhesion between the prepolymer layers and excellent adhesion between the polymer layer and the metal layer. It is desirable that the method of making the metallized paper be capable of being tailored to particular application requirements for the metallized paper, e.g., to accommodate the creation of a multilayer coating tailored to achieve certain objectives. It is also desirable that the metallized paper be manufactured in a manner that is economically efficient and from materials that are readily available.

SUMMARY OF THE INVENTION

Accordingly, the present invention provides, according to one of the presently preferred embodiments disclosed herein, a metallized paper sheet and method for making the same. Metallized paper sheet materials can be produced with superior appearance and performance characteristics which can be tailored to specific end use applications. For example, the metallized paper can be produced with a very shiny, high gloss surface appearance, and/or a high quality metallized layer free of defects or pinholes, and/or an outer surface which is highly receptive to printing.

The present invention, however, provides features and advantages which are applicable not only to paper substrates, but to other sheet material substrates as well, such as polymer film sheet materials or other kinds of metal or metallic sheet materials.

According to one general aspect of the present invention, there is provided a sheet material which is comprised of a sheet material substrate, such as for example a film or paper sheet, with a polymer base coating overlying and adhered to a surface of the sheet material substrate. The base coating comprises a radiation cured crosslinked polymer derived from at least one vapor deposited acrylate prepolymer composition having a molecular weight in the range of from about 150 to 600. A metal layer is deposited on and overlies a surface of the base coating, and a polymer top coating overlies and is adhered to a surface of the metal layer. The top coating comprises a radiation cured crosslinked polymer derived from a vapor deposited acrylate prepolymer composition having a molecular weight in the range of from about 150 to 600 and a ratio of its molecular weight to its number of acrylate groups (MW/Ac) in the range of from about 150 to 600. Desirably, the top coating is derived from at least 20% by weight of a polyfunctional acrylate monomer or blend thereof. Where good printability or good adherence to other surfaces is desired, the prepolymer composition for the top coating preferably also comprises a polar acrylate monomer selected from the group consisting of amine acrylates, acid acrylates, ether acrylates and polyol acrylates. It is also desirable that the acrylate monomer or blend thereof have a ratio of its molecular weight to its number of acrylate groups (MW/Ac) of at least 150 and below 600, and that the polar acrylate monomer have a dielectric constant of 4 or higher.

The vapor deposition used in producing the polymer base coating and top coating gives great versatility in the composition and thickness of the respective coatings, allowing the sheet material products of this invention to be tailored to specific end use requirements. For example, the polymer base and top coatings can be formed of a single polymer layer or of multiple layers of the same or of different composition. By applying the base coating to a substrate in the form of multiple thin coating layers, surface irregularities present in the surface of the substrate can be filled and smoothed. Due to the greatly improved surface quality of the substrate, the overlying metal layer can be applied substantially defect-free (e.g. fewer than five pinholes per square centimeter of metallized surface) and can form an extremely bright and glossy metallic appearance (e.g. a 60 degree surface gloss rating of at least 60).

A metallized paper sheet in accordance with the invention comprises a paper substrate, a polymer base coating overlying and adhering to a surface of the paper substrate and comprising at least one layer of radiation cured cross-linked polymer derived from at least one vapor deposited acrylate prepolymer composition having a molecular weight in the range of from about 150 to 600, and a metal layer deposited on and overlying a surface of the base coating. A polymer top coating is provided overlying and adhered to a surface of the metal layer, with the polymer top coating comprising at least one layer of a radiation cured crosslinked polymer derived from a polyfunctional acrylate monomer or blend thereof having an average molecular weight in the range of from about 150 to 600 and a polar acrylate monomer having a molecular weight in the range of about 150 to 600. According to one embodiment of the invention, the metallized paper sheet is further characterized by having a 60 degree surface gloss rating of at least 60. According to another embodiment of the invention, the polymer top coating includes a first radiation cured crosslinked acrylate polymer layer adhered to a surface of the metal layer and a second radiation cured crosslinked acrylate polymer layer adhered to the first polymer layer, and wherein the second acrylate polymer layer is derived from a polyfunctional acrylate monomer having a ratio of its molecular weight to its number of acrylate groups (MW/Ac) of at least 150 and less than 600 and a polar acrylate monomer selected from the group consisting of amine acrylates, acid acrylates, ether acrylates and polyol acrylates.

The acrylate coatings of the present invention have applicability not only for sheet materials of the type described above, but also as applied to other metallic sheet materials. Sheet materials according to the invention may comprise a metallic sheet material substrate, and a polymer coating overlying and adhered to a surface of said metallic sheet material substrate, wherein the coating comprises a radiation cured crosslinked polymer derived from a vapor deposited acrylate prepolymer composition having a ratio of its molecular weight to its number of acrylate groups (MW/Ac) of from 150 to 600. Preferably, the prepolymer composition comprises at least 20% of a polyfunctional acrylate monomer. According to one embodiment of the invention, the prepolymer composition additionally includes a polar acrylate monomer having a dielectric constant of 4 or higher. Preferably, the polar acrylate monomer is selected from the group consisting of amine acrylates, acid acrylates, ether acrylates and polyol acrylates.

The coatings of the present invention can be advantageously applied to porous substrates such as paper and to nonporous substrates, such as polymer films, and can either have other coating layers applied thereto, such as a metal layer as described above, or they can serve as the outer surface of a coated article. Such sheet materials may comprise a sheet material substrate and a polymer coating overlying and adhered to a surface of said sheet material substrate, wherein the coating comprises a radiation cured crosslinked polymer derived from a vapor deposited polyfunctional acrylate monomer and a vapor deposited polar acrylate monomer selected from the group consisting of amine acrylates, acid acrylates, ether acrylates and polyol acrylates, said monomers having a molecular weight in the range of from about 150 to 600. In a preferred embodiment, the polyfunctional acrylate monomer has a ratio of its molecular weight to its number of acrylate groups (MW/Ac) of at least 150 an no more than about 600. In one useful embodiment, the radiation cured crosslinked polymer additionally includes a silicone or fluorinated acrylate component and the cured crosslinked polymer may have a thickness of 0.5 micron or less.

Metallized sheet materials in accordance with the present invention are preferably made using a onepass process under vacuum conditions. A metallized sheet material having a polymer base coat, a metal layer and a polymer top coat is made by vapor depositing on a surface of a sheet material substrate a base coat composition comprising at least one acrylate prepolymer composition having a molecular weight in the range of from about 150 to 600. The base coat composition is polymerized to form a polymer base coat. A metal layer is then vapor deposited on the polymer base coat by vacuum metallization techniques. Then a top coat composition comprising an acrylate prepolymer composition is vapor deposited onto the metal layer. The acrylate prepolymer composition of the top coat composition has a molecular weight in the range of from about 150 to 600. The top coat composition is polymerized to form a polymer top coat adhered to a surface of said metal coating layer. Preferably, the base coat layer and the top coat layer are each polymerized by low-voltage electron beam curing.

The metallized sheet material produced according to this method is substantially pinhole free, having fewer than five pinholes per square centimeter, and has a high surface gloss measuring at least 60 on a Dr. Lange reflectometer at approximately 60 degrees.

BRIEF DESCRIPTION OF THE DRAWINGS

These and other features and advantages of the present invention will become appreciated as the invention becomes better understood with reference to the specification, claims and drawings wherein:

DETAILED DESCRIPTION

Figure 1A:
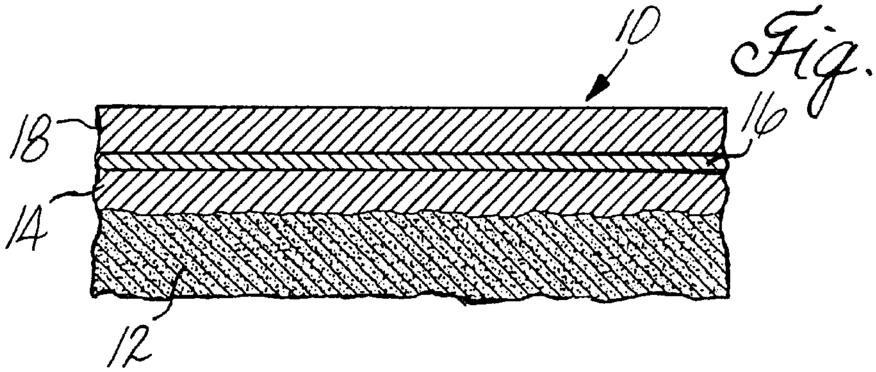
FIGS. 1A to 1D are schematic cross sectional views of a porous substrate, such as paper, comprising a metallized coating and acrylic polymer base coating and top coating layers according to principles of this invention.

The present invention will be now described more fully as applied to several specific embodiments. It should be understood, however, that these specific embodiments are provided for purposes of providing a better understanding of the invention and how it may be practiced in various ways. The specific embodiments illustrated and described herein are merely examples and should not be construed as limiting or restricting the scope of the invention.

FIGS. 1A to 1D illustrate various metallized sheet material products in accordance with the present invention. Each of these sheet material products includes a porous substrate 12, such as paper, having a multi-layer coating thereon, wherein the multi-layer coating includes a polymer base coating 14 overlying the surface of the porous substrate 12, a metal coating 16 overlying and adhered to the base coating 14 and a polymer top coating 18 overlying the metal coating layer 16. In the various products, the arrangement and composition of the various layers varies, as explained more fully below. For consistency and ease of understanding, however, the same reference numbers will be used in FIGS. 1A to 1D to identify corresponding coating layers.

It will be recognized that in the drawing, the various layers are drawn schematically and at a scale suitable for purposes of clarity and illustration, rather than at the scale of the actual material. For example, the a porous substrate may be a paper sheet having a thickness in the range of from 30 to 150 micrometers. The thickness of each of the polymer layers may be on the order of three micrometers or less. In a preferred embodiment, the base polymer layer has a thickness in the range of from 1.5 to 3.5 micrometers, the metal layer has a thickness of about 300 angstroms, and the polymer top coat has a thickness in the range of from one to two micrometers. The term "polymer" is used herein in the general and generic sense, and is intended to be inclusive of homopolymers, copolymers, terpolymers and polymer blends.

The porous substrate 12 may be selected from various different blends and/or types of paper, cardboard, recycled paper and the like. The porous substrate may be precoated with clay or a polymer coating layer, or may be uncoated. A particularly preferred porous substrate is clay coated Kraft paper. Clay coated paper is desired due to its high quality in terms of wearability, its smooth surface, and its ability to provide strong adhesive bond with adjacent surface coatings.

It is desired to coat a surface of the paper sheet with a base coat 14 comprising one or more layers of polymer material to smoothen the surface of the paper by filling irregularities, such as craters and crevices in the clay paper surface. The use of the polymer base coat smoothening layer provides a uniformly smooth surface upon which to deposit the metal layer. Without the polymer smoothening layer, the clay paper surface is not smooth enough to provide a shiny metallized finish.

In its simplest form as illustrated in FIG. 1A, a metallized paper 10 according to principles of this invention comprises a porous paper substrate 12 having a base coat 14 which includes a single layer of a crosslinked polymer deposited on the surface of the paper substrate. A metal layer 16 is deposited on the surface of the crosslinked polymer layer 14. A top coat 18 comprised of a single layer of crosslinked polymer is deposited on the surface of the metal layer 18. The base coat 14 and the top coat 18 may be of the same or of differing chemical compositions.

Figure 1B:
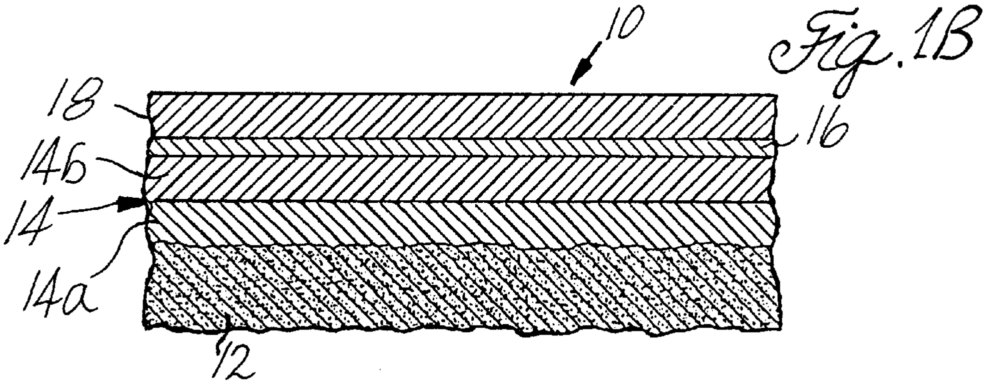

The product illustrated in FIG. 1B is similar to that of FIG. 1A except that the base coat 14 is a multilayer coating, including a first coating layer 14*a* and a second coating layer 14*b*. The two layers 14*a* and 14*b* may be of the same or of differing composition. When the substrate is relatively rough, is may be desirable to deposit a relatively thick base coating, e.g. on the order of 3 to 4 microns in thickness, to provide added smoothening. In this case, the base coat may be deposited as two layers, 14*a*, 14*b*. It may also be advantageous to apply the base coating as two layers for higher production speeds. For smoother substrates, or to achieve a slightly matte finish to the coating, a thinner coating, e.g. on the order of 1.5 to 2.5 microns thick may be applied, which may be suitably applied either as a single coating layer or as two coating layers.

Figure 1C:
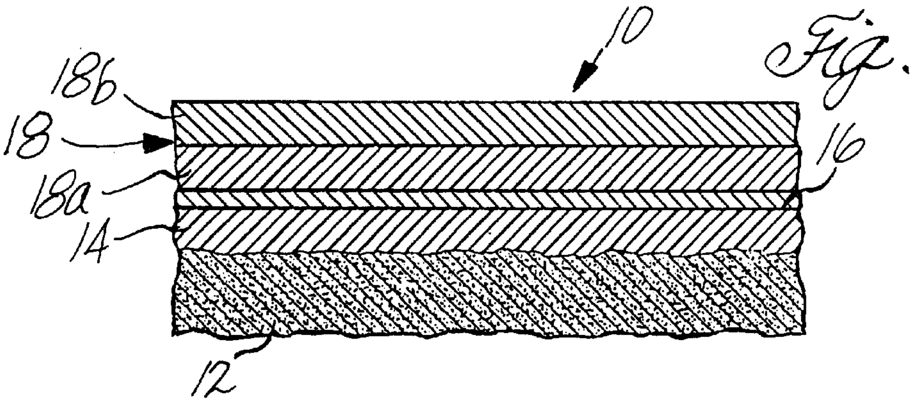

As shown in FIG. 1C, the top coat 18 may also be a multilayer coating. The top coat 18 includes a first coating layer 18*a* and a second coating layer 18*b*. The two layers 18*a*, 18*b* may be of the same or of differing composition, and each may be of the same or of different composition from the base coat 14. The top coat 18 should preferably be at least about 1 micron thick if it is desired to avoid color effects in the coating. A layer of this thickness can easily be deposited in a single layer. However, the use of two coating layers may be desirable for various reasons, such as for ease of processing or to control over the surface properties of the product. For example, the composition of second (exterior) coating layer 18*b* may be selected to provide enhanced adherence to printing inks, or low adherence characteristics (i.e. release properties). A top coat thickness less than about 1 micron may be useful in applications where color effects are of no concern, such as where the sheet material is to be laminated or sealed to another layer.

Figure 1D:
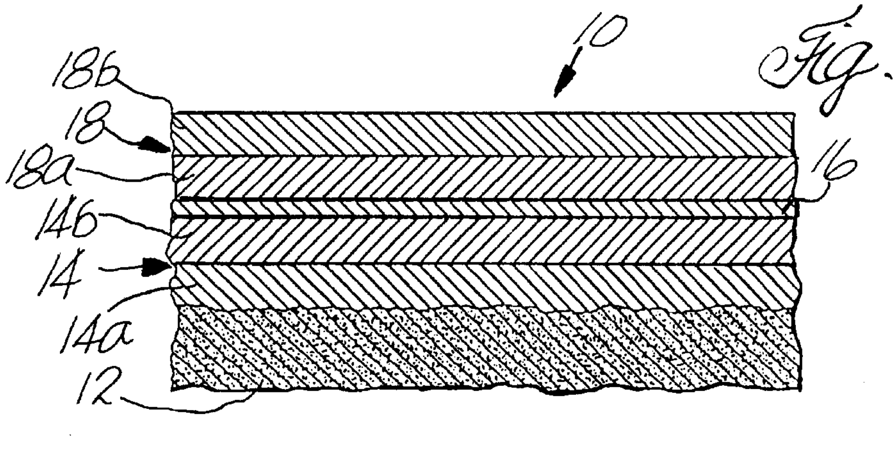

FIG. 1D illustrates a product wherein both the base coat 14 and the top coat 18 are of multilayer construction. Depending upon the specific product characteristics desired, the respective layers may be of the same or of differing composition.

Figure 2A:
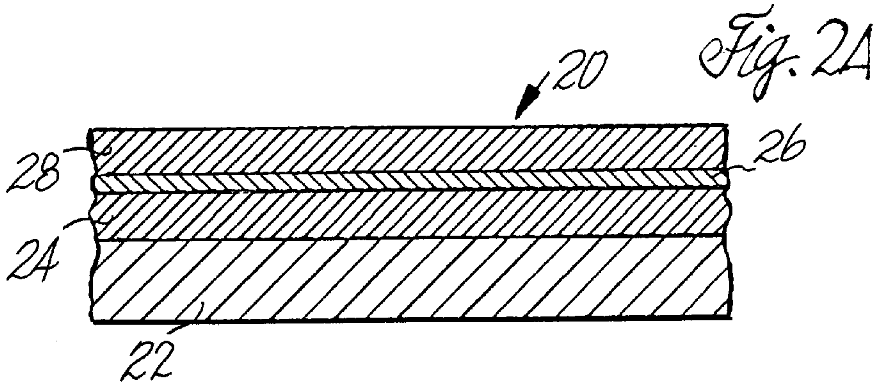
FIGS. 2A to 2D are schematic cross sectional views similar to FIGS. 1A to 1D, but showing a nonporous substrate, such as a polymer film, comprising a metallized coating and acrylic polymer base coating and top coating layers according to principles of this invention.
Figure 2B:
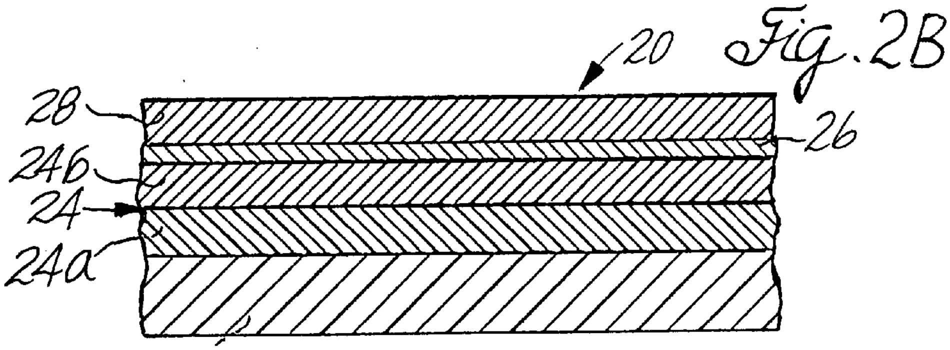
Figure 2C:
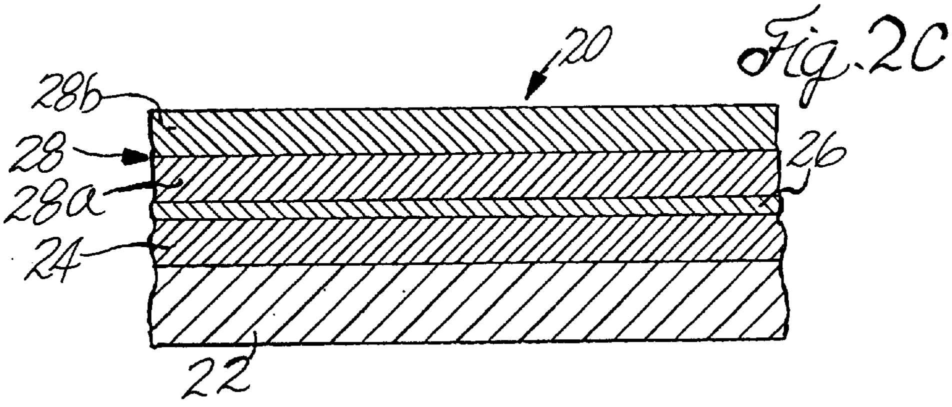
Figure 2D:
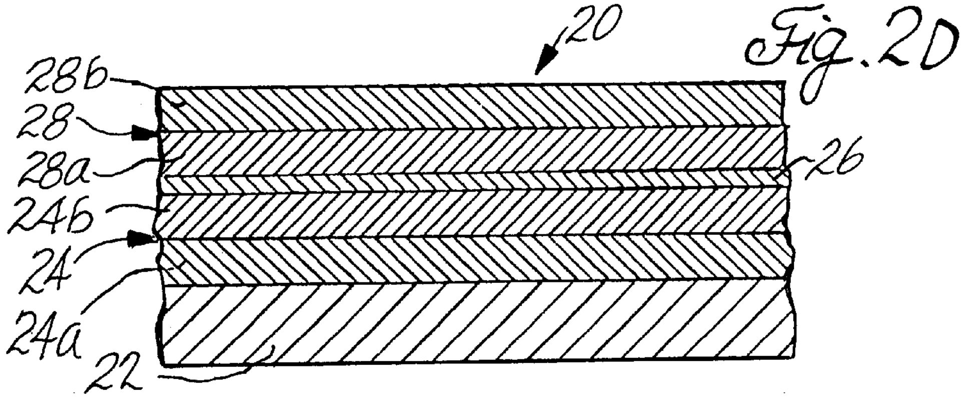

Principles of this invention are also used in producing metallized sheet material products from nonporous substrates. Thus, as shown in FIGS. 2A to 2D, a sheet material 20 has a nonporous polymer film substrate 22. A base coat 24 of a crosslinked polymer is deposited on the surface of the nonporous film substrate 22. A metal layer 26 is deposited on the surface of the crosslinked polymer layer 24. A top coat 28 is deposited on the surface of the metal layer. As shown in FIGS. 2B and 2D, the base coat 24 may be of two individual layers of the same or of differing chemical compositions. Likewise, as shown in FIGS. 2C and 2D, the top coat 28 may be two individual layers of the same or of differing chemical compositions.

Coating Process and Apparatus

Metallized sheet material product structures such as those illustrated in FIGS. 1A–1D or 2A–2D as described above, as well as other multilayer coated products are preferably produced in a one-pass vapor deposition process that is carried out within a vacuum chamber. A suitable apparatus for carrying out this process according to the present invention is shown schematically in FIG. 5. This process and apparatus does not rely on using solvent based prepolymer materials and effecting solvent evaporation and curing in an oven, as has been done in prior processes, and thus eliminates the inherent problem of pinhole formation and related low surface gloss associated with such prior processes. Since monomer is deposited from the vapor state, there can be no trapped gas or low molecular weight solvent-type materials giving rise to bubbles and high extractable content. Additionally, the method of this invention does not rely on the multi-step process of using a high-voltage electron beam to cure the prepolymer materials and, thus eliminates the inherent problem of substrate embrittlement associated with such process. Rather, the method of this invention comprises sequential pretreatment, deposition, and curing steps for both the prepolymer material layers and the metal layer that results in the production of a continuous sheet of metallized paper that is virtually pinhole free and has a high surface gloss.

Figure 5:
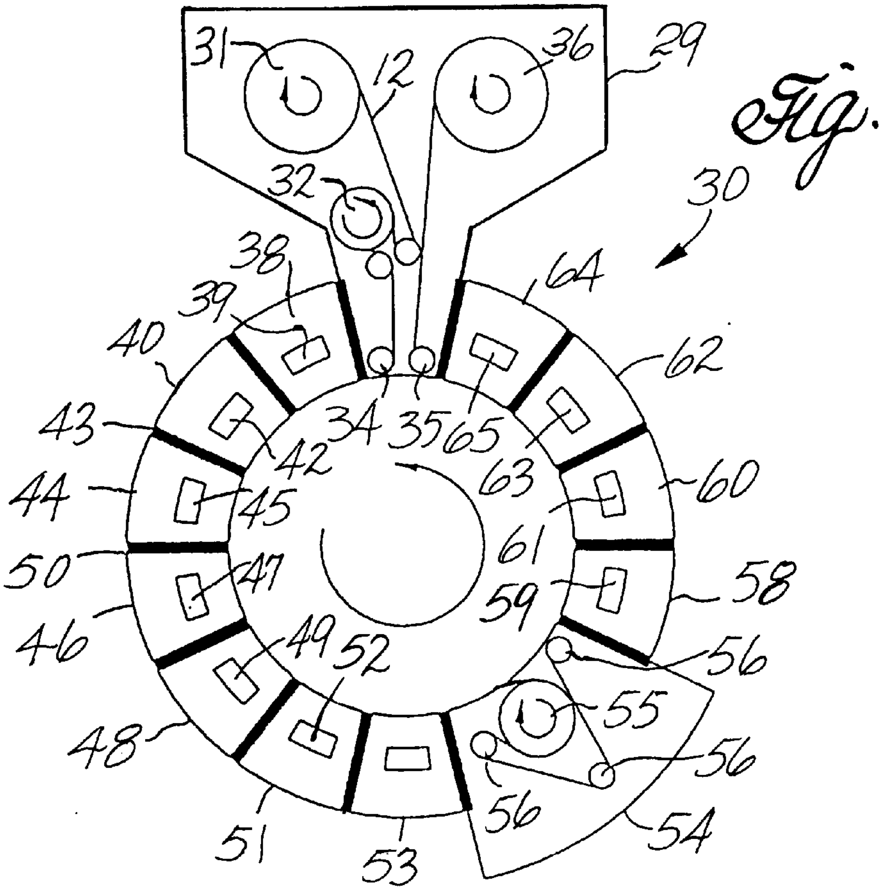
FIG. 5 is a schematic view of an apparatus for coating a substrate sheet material.

The method and apparatus of FIG. 5 can be used to produce a variety of specific product structures, including those illustrated in FIGS 1A–1D and 2A–2D. The description which follows explains how the more complex product of FIG. 1D is produced. From this description, it should be evident to those of ordinary skill in the art how to produce other specific product structures, including the simpler product structures of FIGS. 1A–1C and 2A–2C. The same overall apparatus can be used, with one or more of the coating and curing stations inactivated.

Referring to FIG. 5, a continuous multistation coating and curing apparatus is indicated generally by the reference character 30. The entire apparatus is housed within a vacuum chamber 29. In a preferred embodiment, the vacuum chamber is operated under a vacuum in the range of from about $10^{-1}$ to $10^{-5}$ Torr. It is desired to conduct the metallization process within a vacuum chamber because it has been observed processing under a vacuum helps to provide a metallized paper product having an abrasion resistant, high gloss surface finish. It is believed that the process of metallizing a porous substrate within a vacuum helps to eliminate the occurrence of pinholes in the metallized product because in a vacuum the prepolymer coatings are applied directly to the substrate surface and there is little possibility of air being trapped under the coating and then be released later to form a pinhole. This allows the prepolymer material to be deposited down into surface irregularities of the substrate, i.e., craters and crevices, to fill these areas and leave a smooth substrate surface.

Carrying out the process under vacuum conditions also purges volatile components from the deposited prepolymer material during the evaporation and condensation process that will be discussed in greater detail below. Most commercially available acrylate monomers contain some small amount of low molecular weight volatiles, such as impurities, unreacted raw materials, or byproducts. During the evaporation process, these low molecular weight volatiles will be removed under the existing vacuum conditions. The removal of such volatile components eliminates the possibility that pinholes may be formed by the release of such components from the deposited prepolymer surface. Additionally, the method of metallizing a porous substrate under vacuum conditions also enhances the cure of the deposited prepolymer material by the elimination of oxygen inhibition. Accordingly, the deposited prepolymer undergoes a more uniform and complete cure to form a more abrasion resistant surface coating.

The paper substrate 12 in the form of a continuous sheet is stored on a rotatable pay-out reel 31 mounted adjacent a rotatable drum 33. The paper sheet forming the substrate is routed downwardly from the pay-out reel 31 and around a face chill roll 32 and then around a guide roll 34 and onto the surface of the rotatable drum 33. The feed guide roll 34 is mounted adjacent the drum 30 and serves to feed the paper sheet onto the surface of the drum 33 and maintain a predetermined degree of tension on the paper sheet. The face chill roll 32 is cooled by a suitable circulating coolant in order to chill the surface of the paper substrate which is to subsequently be vapor coated to thereby facilitate subsequent condensation of the prepolymer layer. As the paper sheet is rotated with the drum 33 it passes by a number of different process stations that effect the coating process. Each of these process stations are discussed in detail below.

A take-up guide roll 35 is mounted adjacent the drum 33 at a location adjacent the feed guide roll 34. The take-up guide roll 35 serves to both maintain a predetermined degree of tension on the paper sheet and guide the paper sheet from the drum to a take-up reel 36. The coated paper sheet fed to the take-up reel is stored on the reel until a predetermined length of paper sheet has been metallized.

As the paper sheet is guided onto the surface of the drum 33 and rotated past the feed roll 34, the exposed surface of the paper sheet first undergoes a pretreatment process at a pretreatment station 38. It has been discovered that surface treatment within a vacuum chamber before the step of depositing a prepolymer material onto the surface is desirable. The surface treatment may selected from surface treatment techniques including plasma treatment, corona discharge, flame treatment and the like. Prior surface treatments in air may produce a benefit that decays with time. In a preferred method, the paper sheet is subjected to plasma treatment within the vacuum chamber just prior to the vapor deposition step. Plasma treating prior to deposition has been found to both enhance the surface smoothness of the paper sheet and enhance the adhesion of a first prepolymer layer to the paper sheet surface.

The exact effect of the plasma treatment is not known. It could be that oxygen and/or nitrogen in the plasma reacts with carbonaceous or hydrated compounds on the substrate surface to form polar species which are very compatible with the prepolymer coating materials. It could be that there is plasma etching of the surface that acts to enhance the substrate's surface area and, thus enhance adhesion. It could simply be that the high activation of the plasma essentially blasts surface contaminants off of the surface to provide a more suitable contamination-free attachment site for subsequent material deposition. For one or more of the above reasons it is believed that the use of plasma treatment contributes to the formation of a substantially pinhole free metallized product.

The gases that are used in the plasma treatment include oxygen and nitrogen, which have been found to be effective. No significant differences have been observed between plasma treatments using air, nitrogen or oxygen. It has been hypothesized that air or oxygen is best for treating a metal layer of aluminum since the oxidation may make the somewhat acidic aluminum more nearly neutral. It has also been hypothesized that the surface is made more polar by reason of plasma treatment. Regardless, it has been found desirable to employ plasma treatment before each prepolymer deposition step, and before any vacuum metallization step.

A conventional plasma gun 39 is positioned within the pretreatment station 38 downstream from the feed roll 34 and upstream from a first deposition station 40, and serves to pretreat the surface of the paper sheet before a first layer or film of prepolymer material is deposited. A conventional plasma generator is used in conjunction with the plasma gun. In a preferred embodiment, the plasma generator is operated at a voltage of about 300 to 1000 volts with a frequency of about 50 Khz. Power levels are in the order of 10 to 500 watts/inch. Plasma treatment powered by D.C. has also been found to be effective.

A first deposition station 40 comprises a flash evaporator 42 mounted in proximity to the drum 33 downstream of the plasma gun 39. The flash evaporator 42 deposits a first layer or film of prepolymer material onto the pretreated surface of the substrate sheet as it travels around the drum.

The prepolymer materials used for the base coat 14 and the top coat 18 are volatilizable radiation curable acrylate prepolymer compositions. In order to be suitably applied by using the evaporation and condensation techniques described, the prepolymer composition should preferably have a molecular weight in the range from about 150 to 600 and a viscosity of no more than 200 centistokes at 25° C. Specific prepolymer composition are described below.

Evaporation of the prepolymer composition is preferably from a atomized flash evaporation apparatus of the type described in U.S. Pat. Nos. 4,722,515, 4,696,719, 4,842,893, 4,954,371 and/or 5,097,800. These patents also describe polymerization of an acrylate by radiation. In such atomizing and flash evaporation apparatus, liquid acrylate monomer is injected into a heated chamber as 1 to 50 micrometer droplets. The elevated temperature of the chamber vaporizes the droplets to produce a monomer vapor. The monomer vapor fills a generally cylindrical chamber with a longitudinal slot forming a nozzle through which the monomer vapor flows. A typical chamber behind the nozzle is a cylinder about 10 centimeters diameter with a length corresponding to the width of the substrate on which the monomer is condensed. The walls of the chamber may be maintained at a temperature in the order of 200 to 320° C. Two styles of evaporator are suitable. In one of them, the orifice for injecting droplets and flash evaporator is connected to one end of the nozzle cylinder. In the other style, the injector and flash evaporator section is attached in the center of the nozzle chamber like a T.

It is believed that the use of a vapor deposition process, under vacuum conditions and subsequent to the surface pretreatment process, contributes to the formation of a metallized product that has superior gloss and is substantially pinhole free because prepolymer is allowed to reach into and penetrate irregularities in the substrate surface and, thereby smoothen such irregularities and form an air impenetrable barrier thereon. Also, because of the vapor deposition process, there is no air or solvent entrapment.

After being coated with the first monomer layer, the substrate sheet passes a curing station 44 where the first prepolymer layer is irradiated by a radiation source such as an electron gun or source of ultraviolet radiation. The UV radiation or electron bombardment of the prepolymer layer induces polymerization and crosslinking of the prepolymer, forming a first crosslinked polymer layer.

In a preferred embodiment, a low-voltage electron beam gun 45 is used as the irradiating source and is adjusted so that the electron beam emitted just penetrates the coating and is about 10 kilovolts per micrometer of coating but less than about 25 kilovolts. Adjusting the output of the electron beam gun so that it just penetrates the coating is desirable because it leaves the bulk of the underlying paper substrate untouched, thus eliminating the potential for paper embrittlement and promoting the formation of a coated paper product having a higher fiber tear and tensile strength than the uncoated paper. The use of a vacuum deposition process allows for the use of low-voltage electron beam curing and, thus avoids any damage to the substrate.

By comparison, in a standard non-vacuum air coating process, a high-voltage electron beam gun operated at about 175 kilovolts is used to effect curing of the deposited prepolymer. The electron beam discharge emitted from the high-voltage electron beam gun and directed to the substrate is not limited to the prepolymer layer but, rather, passes through the prepolymer layer and penetrates the paper sheet and embrittles it. Accordingly, the use of such high voltage electron beam curing reduces the tear resistance and tensile strength of the paper sheet by about 20 percent during a typical curing process using about 6 megarads of electron beam dose.

A secondary benefit of using a low-voltage electron gun is that its use does not require extensive lead shielding that is typically required for the use of high-voltage beams that create high gamma ray dose levels. The use of low-voltage electron beam curing is also very efficient, as all of the electron energy is directed and deposited only in the coating to effect curing.

The first deposition station 40 is separated from the curing station 44 by a baffle 43 which serves to prevent uncondensed acrylate monomer or prepolymer in the deposition station 40 from floating downstream into the curing station 44. This prevents the crosslinked polymer layer produced in curing station 44 from being contaminated with uncured prepolymers. The baffle 43 may be cryogenically cooled to condense and trap errant prepolymer vapor. Also, pumps may be associated with the deposition station and/or the curing station 44 to control the vacuum level in these zones and control unwanted movement of the prepolymer vapors.

The sheet then passes a second deposition station 46 mounted adjacent the drum. The second deposition station comprises a second flash evaporator 47 generally similar to that described above that is used to deposit a second prepolymer layer onto the first crosslinked prepolymer layer as the substrate sheet is rotated with the drum 33. It has been discovered that adhesion between successive prepolymer layers is enhanced if the prepolymer layers are deposited and cured in the same pass. This helps to tie the prepolymer groups into each other before they are terminated. To ensure optimum inter-layer adhesion it is desired that the prepolymer layers be deposited and cured in a single pass within a time span in the range of from 0.001 to 2 seconds apart. This also ensures that prepolymer is deposited and cured before the freshly deposited prepolymer layer is exposed to air, where oxygen inhibition of the cure process can occur. In a preferred method, the prepolymer layer is deposited and cured approximately 0.05 seconds apart.

The sheet passes a second curing station 48 that is operated in the same manner as that described for the first curing station 44 to effect polymerization and cross-linking of the second prepolymer layer to form a second cross-linked prepolymer layer. The curing station 48 includes an electron beam gun 49. Each first and second prepolymer layer may have a thickness in the range of from 0.5 to 2 micrometers and have combined thickness of the first and second prepolymer layers may be in the range of from 1 to 4 micrometers. Accordingly, each electron beam gun 45 and 49 is adjusted to emit a low-voltage electron beam in the range of from 7 to 25 kilovolts.

A baffle 50 is provided between the first curing station 44 and the second deposition station to form an isolation zone separating the first deposition and curing process from the second.

The sheet then passes a second pretreatment station 51 containing a second plasma gun 52 mounted adjacent the drum as the sheet is rotated with the drum. The second plasma gun 52 is used to pretreat the surface of the second cross-linked prepolymer layer before application of the metal layer, forming polar groups on the surface of the second cross-linked prepolymer that enhance inter-layer adhesion. It is also hypothesized that during the deposition process there is some evaporated prepolymer distributed throughout the remaining gas in the vacuum chamber. This unreacted prepolymer may condense on the cooler surface of the second cross-linked prepolymer prior to reaching a metallization station 53. In the activated environment within the vacuum chamber, some of the polymer may be only partially reacted and thereby form an intervening layer between the second cross-linked prepolymer and the subsequently deposited coating, acting to reduce adhesion. It is, therefore, desired that any unreacted or condensed prepolymer be removed from the substrate surface before further deposition. It has been found that plasma treating the surface of the second cross-linked prepolymer layer prior to medullization provides improved adhesion between the metal and second cross-linked prepolymer layers.

Sequential plasma treatment for removing deposited prepolymer may be minimized by partitioning the evaporator of each deposition station from the rest of the vacuum chamber. For example, tight fitting baffles cooled with liquid nitrogen can serve to condense stray prepolymer from the evaporator and provide a tight or tortuous path for minimizing transmission of the atomized prepolymer vapor that does not condense. In addition to the baffles 43, 50 noted earlier, baffles are provided between the second deposition station 46 and the curing station 48, between the curing station 48 and the pretreatment station 51, and between the pretreatment station 51 and the metallization station 53.

The sheet then passes to the metallization station 53 mounted adjacent the drum that deposits a thin layer or film of metal coating onto the surface of the second cross-linked prepolymer layer. The metal material can be deposited by use of conventional deposition techniques such as by vacuum metallizing, sputtering and the like. The metallizing material may be selected from the group including metals and alloys of metals that possess the desired physical characteristic of tensile strength, ductility, shine, color and the like. A preferred metallizing material is aluminum that is applied having a film thickness of approximately 300 angstroms.

Upon leaving the metallizing station, the sheet passes through a chilling station 54 and is directed around a face chill roll 55 which chills the metallized surface of the sheet. The face chill roll 55 may be cooled by circulating a suitable coolant through the roll. Guide rolls 56 redirect the sheet material from the face chill roll 55 back onto the surface of drum 33.

The sheet then passes to a third deposition station 58 as it is rotated with the drum. The deposition station 58 includes a third flash evaporator 59 is mounted adjacent to the drum, similar to the flash evaporators 42 and 47 previously described. The third flash evaporator deposits a first top coat prepolymer layer onto the surface of the metal layer. In a preferred embodiment, the first top coat prepolymer layer has a thickness in the range of from 0.5 to 2 micrometers.

The sheet then passes to a fourth deposition station 60 where a fourth flash evaporator 61 is mounted adjacent to the drum similar to the flash evaporators 42, 47 and 59 previously described. The fourth flash evaporator deposits a second top coat prepolymer layer onto the surface of the first top coat prepolymer layer. In a preferred embodiment, the second top coat prepolymer layer has a thickness in the range of from 0.5 to 2 micrometers. Accordingly, the first and second top coat prepolymer layers have a combined thickness in the range of from one to four micrometers.

A multi-layer top coat is desirable because it provides an opportunity to tailor the top coat, i.e., use top coats made from different chemical compositions, to provide different physical characteristics that may be required for a particular application. For example, it may desired that the top coat have both good adhesion to the metal layer and still have a very printable surface with some slip for certain applications. In such an application, it would be desirable to form a first top coat comprising a blend of an acidic component, since it has been shown that the addition of an acidic component to an acrylate prepolymer improves adhesion to the metal layer, and deposit this first top coat onto the surface of the metal layer. It would also be desirable to deposit a second top coat on top of the first top coat that would comprise a different prepolymer composition to provide enhanced printability or slip. Since each top coat is deposited rapidly in succession there is little mixing and they can be cured together.

Figure 7:
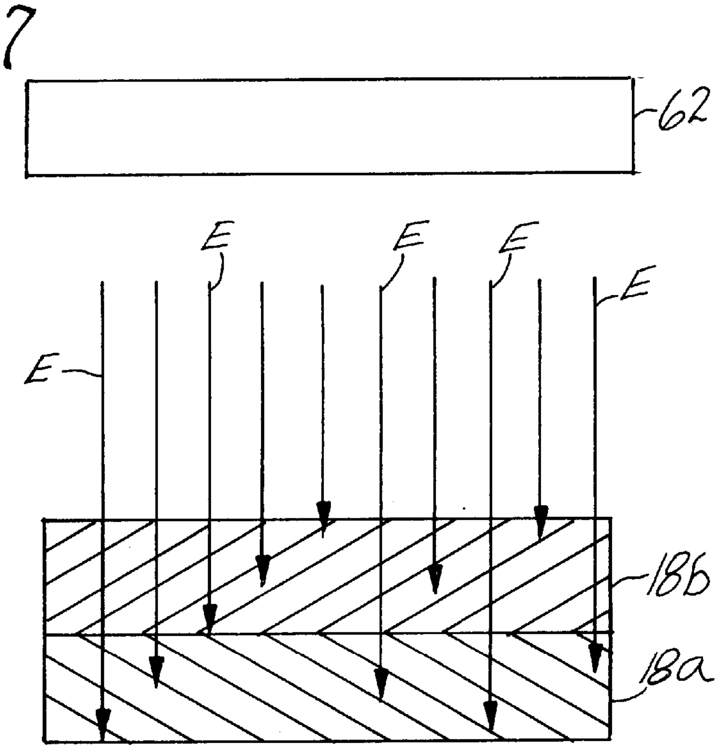
FIG. 7 is a schematic illustration of a single layer deposition and cure technique according to principles of this invention.

A third curing station 62 is mounted adjacent the drum 30 and includes an electron gun 63 similar to electron guns 45 and 49. Referring to FIG. 7, the third electron gun 62 is adjusted to emit electron beams sufficient to effect polymerization and cross-linking of both the first and second top coat prepolymer layers to form first and second top coats 18*a*, 18*b* of cross-linked prepolymer. In a preferred embodiment, the third electron gun voltage is adjusted to emit electron beams so that it thoroughly penetrates the first and second top coating, just barely reaching the underlying layers. In a preferred embodiment, the third electron gun 62 is adjusted to emit a low-voltage electron beam in the range of from 10 to 25 kilovolts.

The multi-layer curing technique described above is employed to take advantage using different top coat compositions having particularly desired physical properties. Multi-layer curing is desirable where the multi-layer thickness is below about 2.5 micrometers.

Figure 8:
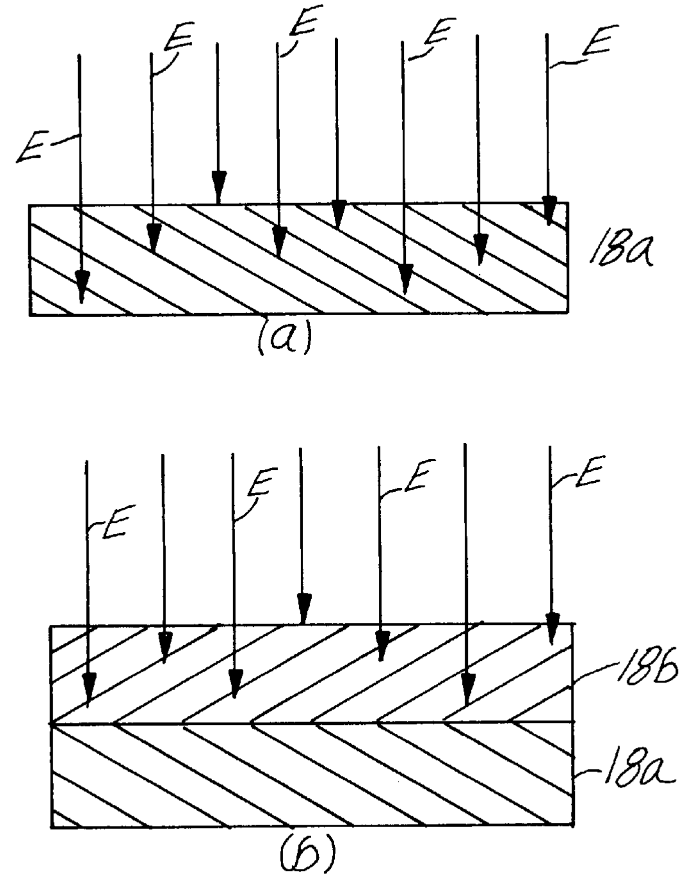
FIG. 8 is a schematic illustration of a multi-layer deposition and cure technique according to principles of this invention.

In an alternative embodiment, the apparatus can be configured to deposit and cure the first top coat independent of the second top coat by the placement of an electron beam gun between the third and fourth flash evaporators, as long as each top coat is deposited and cured rapidly in sequence as previously described to reduce the possibility of oxygen inhibition. Although not specifically shown in the drawing, alternative method and apparatus for depositing and curing the top coat prepolymer layers independently is essentially very similar to that disclosed above for depositing and curing the first and second prepolymer layers prior to metallization. Accordingly, electron beam guns are positioned downstream of each third and fourth flash evaporators and adjusted to just penetrate the most recent prepolymer layer as shown in FIG. 8(*a*) and 8(*b*). Using such an independent single layer curing technique is desirable when the thickness of the prepolymer layer to be cured is above about 1.5 or 2 micrometers, however, can be used generally up to a prepolymer thickness of about five micrometers.

While multi-layer top coats have been described and illustrated that include only two successive prepolymer layers, it is to be understood that multi-layer top coats comprising more than two layers are within the scope of this invention. For example, the top coat may comprise three prepolymer layers formed from the same or different type of prepolymer material. Additionally, each top coat layer can either be cured independently, i.e., via the independent single layer cure technique, or can be cured together after each top coat layer is deposited. An example of one application where a three layer top coat could be employed is in the formation of a release coated paper. In such an application, a first top coat layer of a prepolymer material having good adhesion with the paper substrate surface is deposited. A second top coat layer of a different or the same prepolymer material having good adhesion with the first and subsequent top coat layer is applied to the first top coat layer. An optional third top coat layer of a different prepolymer material having releasible adhesion to a subsequent substrate layer and good adhesion with the second top coat layer is deposited to the second top coat layer. The first, second and third top coat layers are cured by passing under a low-voltage electron beam gun that is adjusted to emit electron beams that penetrate the first, second and third top coat layers.

Additionally, it is to be understood that the method of depositing and curing multi-layers of prepolymer materials according to principles of this invention is not to be limited to applications involving only a metallized substrate. Rather, the method of depositing multiple prepolymer layers and afterwards curing the combined prepolymer layers is applicable to any type of substrate, regardless of whether or not the substrate includes a metal layer.

Again referring to FIG. 5, the sheet passes to a fourth curing station 64 mounted adjacent the drum. The fourth curing station includes a plasma gun 65 of the type previously described which serves to remove any foreign matter from the surface of the top coat cross-linked prepolymer layers before the metallized paper is routed past the take-up guide roll 35 and rolled onto the take-up reel 36. It is desired to remove any unreacted prepolymer before storing the metallized paper on the take-up reel because the unreacted prepolymer forms a film on the surface of the top coat that interferes with achieving a high gloss surface finish. Additionally, plasma treating changes the surface chemistry of the top coat cross-linked prepolymer layer to improve printability.

The method for metallizing paper described and illustrated according to principles of this invention results in the formation of a metallized product having a high level of surface gloss. It is believed that this is due to the elimination of pinholes in the metallized paper caused by plasma treating the surface of the substrate, prepolymer, and metal layer before subsequent deposition, depositing the smoothening prepolymer layers using an evaporation process that removes volatiles and trapped air pockets, using a solvent free low viscosity radiation curable prepolymer material to fill the pores and voids in the substrate, and using low-voltage electron beam curing rather than solvent evaporation.

The metallized paper produced by this method is substantially pinhole free, having fewer than five pinholes per square centimeter ($cm^2$), and more typically two to three pinholes per $cm^2$. By comparison, a metallized paper product produced by a high-voltage electron beam curing process may have 20 to 30 pinholes per $cm^2$, and a metallized paper product produced by a solvent evaporation process may have about 1000 pinholes per $cm^2$.

Gloss levels of the metallized paper surface are measured to be in the range of from 60 to 70 as measured on a Dr. Lange reflectometer at approximately 60 degrees. This measurement shines a beam of light at a predetermined angle onto the surface of the substrate and measures the amount of light that is reflected away from the surface. The higher the reflectivity and shine, the higher the gloss level. Accordingly, a high gloss level in most applications is desirable. A gloss level of 60 to 70 is a significant improvement in surface gloss over metallized paper products produced by other known methods. For example, a metallized paper product produced by the solvent-based process typically has a gloss level in the range of from 30 to 40 on the Dr. Lange reflectometer at 60 degrees, and a metallized paper product produced by the gravure high-voltage electron bean curing process typically has a gloss level in the range of from 55 to 65 on the Dr. Lange reflectometer at 60 degrees.

Prepolymer Materials

The prepolymer material which are used in this invention are radiation curable acrylate monomers or blends of acrylate monomers with other flash vaporizable radiation curable compositions, such as additives or higher molecular weight monomer or oligomer materials.

Acrylate prepolymer compositions suitable for vapor deposition in accordance with the present invention generally have an average molecular weight in the range of from 150 to 600. Preferably, the prepolymer composition has a molecular weight in the range of from 200 to 400. Typically, the prepolymer composition comprises one or more acrylate monomers. If the molecular weight is below about 150, the monomer is too volatile and does not condense well for forming a monomer film. Monomer that does not condense on the desired substrate may foul vacuum pumps and hinder operation of an electron gun used for polymerizing the resin. If the molecular weight is more than about 600 the composition does not evaporate readily in the flash evaporator at temperatures safely below the decomposition temperature of the composition. It is also desirable that the monomer have a viscosity less than 200 centistoke (cS) at 25° C. to facilitate atomizing and to promote the filling of surface irregularities on the substrate and previous crosslinked prepolymer surface during condensation, thereby contributing to the formation of a substantially pinhole free high gloss surface. Most desirably, the prepolymer material should have a viscosity in the range of from 10 to 200 centistoke (cS) at 25° C.

Suitable acrylate monomers are those that can be flash evaporated in a vacuum chamber at a temperature below the thermal decomposition temperature of the monomer and below a temperature at which polymerization occurs in less than a few seconds at the evaporation temperature. The mean time of monomer in the flash evaporation apparatus is typically less than one second. Thermal decomposition, or polymerization are to be avoided to minimize fouling of the evaporation apparatus. The monomers selected should also be readily capable of crosslinking when exposed to ultraviolet or electron beam radiation.

Suitable prepolymers not only have a molecular weight and viscosity in the appropriate range, they also have a "chemistry" that provides acceptable adhesion with the adjacent layer and for the particular intended end use. Generally, with respect to acrylates, more polar acrylates have better adhesion to metal layers than less polar acrylate monomers. Long hydrocarbon chains may hinder adhesion to metal but may be an advantage for depositing on non-polar porous surfaces. For example, lauryl acrylate has a long chain that is hypothesized to be aligned away from the substrate and may hinder adhesion to subsequent polar layers. Thus, one acrylate monomer or blend may be used for condensing acrylate on a porous nonmetallic substrate, and a different acrylate may be used for depositing over the metal layer.

Blends of acrylates may be employed for obtaining desired evaporation and condensation characteristics and adhesion, and for controlled shrinkage of the deposited film during polymerization. A typical acrylate monomer used for flash evaporation includes an appreciable amount of a polyfunctional acrylate, e.g. a diacrylate and/or triacrylate, to promote crosslinking. Desirably, the prepolymer composition contains at least 20% by weight of a diacrylate and/or triacrylate, and for some applications it may be desirable for the prepolymer composition to contain 50% by weight or more of a diacrylate and/or triacrylate. The prepolymer composition may also desirably include a monoacrylate to provide flexibility and to minimize shrinkage.

While many acrylate compositions will adhere well to paper or other porous substrates, those with high crosslink density, and hence high shrinkage upon crosslinking, have questionable adhesion and poor flexibility. It is preferred, therefore, to use a prepolymer composition which produces medium to low crosslink density, and medium to low shrinkage. One way to define the crosslink density and shrinkage is to consider the size of the molecule (molecular weight) in relation to the number of acrylate chemical groups per molecule. To obtain a coating with good adhesion to the substrate and flexibility sufficient to pass rigorous bend tests, this ratio of molecular weight to acrylate groups (MW/Ac) should preferably be in the range of from about 150 to 600. Where the prepolymer composition is a blend of two or more monomers or of a low molecular weight monomer with a higher weight monomer or oligomer, the weight average of the MW/Ac ratio for the various constituents should be within this range.

Examples of monoacrylates, diacrylates, triacrylates and tetraacrylates which may be included in the evaporated prepolymer composition include the following: hexane diol diacrylate (HDDA), with a molecular weight of 226; tripropylene glycol diacrylate (TRPGDA), with a molecular weight of about 300; 2-phenoxy ethyl acrylate (M.W. 192); isobornyl acrylate (M.W. 208); lauryl acrylate (M.W. 240); epoxy acrylate RDX80095 made by Radcure of Atlanta, Georgia; diethylene glycol diacrylate (M.W. 214); neopentyl glycol diacrylate (M.W. 212); propoxylated neopentyl glycol diacrylate (M.W. 328); polyethylene glycol diacrylate; tetraethylene glycol diacrylate (M.W. 302); bisphenol A epoxy diacrylate; trimethylol propane triacrylate (M.W. 296); ethoxylated trimethylol propane triacrylate (M.W. 428); propylated trimethylol propane triacrylate (M.W. 470); pentaerythritol triacrylate (M.W. 298); isobornyl methacrylate (M.W. 222); 2-phenoxyethyl methacrylate (M.W. 206); triethylene glycol dimethacrylate (M.W. 286); and 1,6-hexanediol dimethacrylate (M.W. 254).

It is known that adhesion may be enhanced between a substrate and an acrylate coating by using an acrylate containing high molecular weight components. In conventional practice, very high molecular weight oligomers are usually mixed with low molecular weight monomers. The oligomers usually have molecular weights of greater than 1000 and often as large as 10,000 or even higher. The monomers are used as diluents to lower the coating viscosity and provide an increased number of acrylate groups for enhancing cure speed, hardness and solvent resistance in the resulting coating.

It has generally been considered that it is not feasible to evaporate high molecular weight acrylates because of their very low vapor pressure and high viscosity. Evaporated acrylate coatings have been restricted to low molecular weight monomers, generally below a molecular weight of about 600 and with low viscosity. Typically, the viscosities are below 50–200 Cs. For example, Henkel 4770, which is an amine acrylate, has a sufficiently high molecular weight that it has a viscosity of about 1000 cS at 25° C. This material cures in the evaporator before evaporating and, therefore, is not desirable. Beta carboxy ethyl acrylate (BCEA) which has a viscosity of over 200 cS also cures in the evaporator.

It has been found, however, that by mixing a very low and a very high viscosity material, flash evaporation, condensation and curing can be obtained. For example, a mixture of 70 percent of Henkel 4770 and 30 percent diethylene glycol diacrylate has a viscosity of about 120 cS and can be successfully evaporated, condensed and cured. A mixture of 70 percent tripropylene glycol diacrylate (TRPGDA) and 30 percent of beta carboxy ethyl acrylate (BCEA) has a viscosity of about 150 cS and can be readily evaporated, condensed and cured. The low viscosity component lowers the viscosity of the blend, which improves atomization in the evaporator and assists in the flash evaporation of the high viscosity acrylate.

There is essentially a trade off between the molecular weights (and hence viscosities) of the high and low molecular weight prepolymers. Generally, the lower the molecular weight and viscosity of the low molecular weight component, the higher the molecular weight and viscosity of the higher molecular weight component can be for satisfactory evaporation and condensation. The reason for good atomization in the flash evaporator is straightforward. This is essentially a physical effect based on the viscosity of the blend. The reason for successful evaporation is not as clear. It is hypothesized that the low molecular weight prepolymer essentially dilutes the high molecular weight material and energetic evaporation of the lower molecular weight material effectively sweeps along the higher molecular weight material.

When blends of high and low molecular weight prepolymers are used, it is preferred that the weighted average molecular weight of the blend be in the range of from 200 to 600 and more desirably up to about 400. This assures that there is good vaporization of the blend at reasonable temperatures in the evaporator.

Some examples of low molecular weight acrylates are hexane diol diacrylate, diethylene glycol diacrylate, propane diacrylate, butane diol diacrylate, tripropylene glycol diacrylate, neopentyl glycol diacrylate, phenoxyethyl acrylate, isobornyl acrylate and lauryl acrylate. Some examples of high molecular weight acrylates are bisphenol A diacrylate, BCEA, Radcure 7100 (an amine acrylate available from Radcure, Atlanta Georgia), Radcure 169, Radcure 170, acrylated and methacrylated phosphoric acid, Henkel 4770 (an amine acrylate available from Henkel Corporation, Ambler, Pa.), glycerol propoxy triacrylate, and Radcure Ebercrul 350 (a silicone diacrylate available from Radcure).

Particularly preferred high molecular weight materials include BCEA which is acid in character and has a shrinkage of only about 4 percent upon curing. Another suitable material is an acrylate or methacrylate of phosphoric acid. One can also use dimers, trimers and tetrameres of acidic acrylates or methacrylates. For example, Henkel 4770 and Radcure 7100 are each polar compositions and help increase the cure speed and adhesion. In general, the higher molecular weight components are used to add flexibility, reduce shrinkage or provide some particular chemical characteristics such as acid or caustic resistance.

The addition of a polar acrylate component in the polymer top coating 18 or 28 which overlies the metal layer 16 improves the adhesion to the metal layer. Incorporating a polar acrylate component in the exterior-most coating layer can improve the surface properties such as printability. Suitable polar acrylate components include acrylate monomers selected from the group consisting of amine acrylates, acid acrylates, ether acrylates and polyol acrylates. Preferably, the polar acrylate monomer has a dielectric constant of 4 or higher. Examples of acid acrylate monomers include BCEA, which is beta carboxy ethyl acrylate, or P170 made by Radcure, which is phosphoric acid acrylate. Such acid acrylate monomers can also be used to make an acrylate coating removable by caustic solutions, and thus useful in labels to facilitate glass reclamation.

In sheet material products containing a multilayer top coating, such as is illustrated in FIGS. 1C, 1D, 2C, 2D, 3B and 4B, the compositions of the respective layers of the top coating may be selected so as to tailor the product for specific end use applications. It is very important that the layer which is directly on the metal layer (18*a* in FIG. 1C and 1D or 28*a* in FIG. 2C or 2D) have an average MW/Ac functionality of 150 or greater but less than 600 to obtain good metal adhesion. The prepolymer composition for this layer may also include a small amount (e.g. 5 to 20% of an acrylate monomer with polar groups, such as acid, amine, ether or polyol groups, such as the acid acrylate, beta carboxy ethyl acrylate (BECA).

Where the exterior surface is to be printed, it is desirable that the outermost top coating layer (18*b* in FIG. 1C and 1D or 28*b* in FIG. 2C or 2D) have medium to low crosslink density (MW/Ac>150). It is especially useful for this purpose that the coating layer contain acrylate components with polar groups, such as acid, amine, ether or polyol groups.

By way of illustration, a useful metallized paper suitable for printing may be produced by forming a 1.0 micron thick first top coat layer 18*a* from a mixture of 50% by weight TRPGDA (tripropylene glycol diacrylate, MW/Ac=150) and 50% Henkel 8061 (tripropylene glycol methyl ether monoacrylate, MW/Ac=260). The mixture has a MW/Ac ratio of 205. A thin (0.1 to 0.2 micron), highly polar second top coat layer 18*b* is formed over the first layer 18*a* by vapor depositing a mixture of 47.5% TRPGDA, 47.5% Henkel 8061, and 5% BCEA (beta carboxy ethyl acrylate, MW/Ac=144). The BCEA is difficult to refine and to evaporate, but is successfully used in small amounts.

An example of another multilayer polymer top coat is formed by depositing a first top coat layer of tripropylene glycol diacrylate onto the surface of a substrate and depositing a second top coat layer of fluorinated acrylate onto the first top coat acrylate layer. Fluorinated acrylates with molecular weights higher than 600 can be successfully evaporated and applied by vapor deposition and used for forming a deposited acrylate layer. For example, a fluorinated acrylate with a molecular weight of about 2000 evaporates and condenses similar to a non-fluorinated acrylate having a molecular weight in the order of 300.

The acceptable range of molecular weights for fluorinated acrylates is about 300 to 3000. Fluorinated acrylates include monoacrylates, diacrylates, and methacrylates.

Figure 3A:
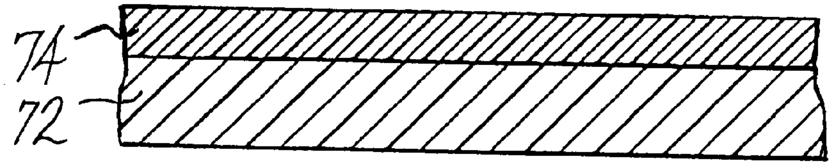
FIGS. 3A and 3B are schematic cross sectional views showing a nonporous substrate such as that of FIGS. 2A and 2B, to which a single layer or multilayer acrylic polymer base coating has been applied.
Figure 3B:
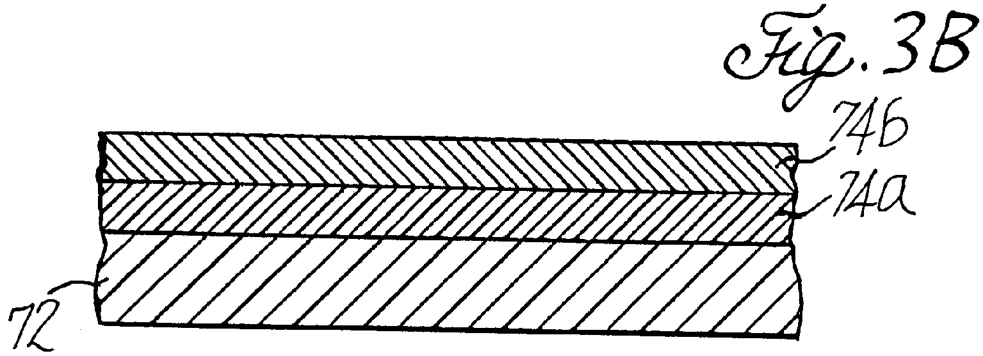

A release coating can be formed by depositing a layer of a silicon-containing acrylate according to the above described method onto the substrate layer or underlying prepolymer layer. One particularly suitable material for forming a release coating is Radcure Ebercrul 350 silicone diacrylate. Coatings with very low release force (less than 40 grams/inch) can be produced with the structures shown in FIGS. 3A and 3B. In the case of FIG. 3A, film substrate 72 of an oriented thermoplastic olefin polymer was coated with a cured crosslinked acrylate polymer layer 74 using processing techniques and apparatus similar to that previously described with reference to FIG. 5. An acrylate blend was used wherein one component was a silicone or fluorinated acrylate component of about 50% of the composition and the balance was a 50/50 blend of TRPGDA and Henkel 8061. In the multilayer coating of FIG. 3B, the top layer 74*b* contains a fluorinated or silicone acrylate component of 50% or more of the total blend and is preferably applied as a very thin layer, no more than about 0.2 microns in thickness. Good release properties can be achieved with a top layer thickness of only a few tenths or hundredths of a micron thickness. Since silicone acrylates and fluorinated acrylates are generally expensive, this provides a significant cost benefit. The underlying layer 74*a* may either contain a lower percentage of the fluorinated or silicone component or may contain no fluorinated or silicone component. Layer 74*a* serves to anchor the release layer to the substrate and provide outstanding adhesion to the plastic substrate.

Silicone acrylates have heretofore been used in an acrylate blend and cured with either UV or electron beam to provide a release coating. These coatings are typically applied with rollers in a thickness of about 1 micron. By diluting the composition with solvents, the coating thickness may be reduced somewhat below this thickness. However, the use of solvents in the work environment presents certain disadvantages. In any event, it has not heretofore been possible to produce solvent free silicone acrylate coatings with a thickness of less than about 0.5 micron. In accordance with the present invention silicone acrylate release coatings on the order of 0.1 micron and less in thickness can be produced.

For a paper or film product requiring good heat seal properties, it is desirable for the outermost acrylate coating to have a higher crosslink density than, for example that which is used for a printable substrate. Preferably, the outermost layer of the top coating (e.g. 18*b* in FIG. 1C and 1D, 28*b* in FIG. 2C and 2D) is formed from an acrylate prepolymer composition having a MW/Ac of less than about 175. To obtain good adherence to the substrate coupled with good heat seal properties, a multilayer top coating can be used wherein the outermost layer of the top coating (18*b*) is a relatively thin (e.g. 0.1 micron or less) coating of a relatively high crosslink density monomer such as TRPGDA or HDODA. The underlying layer is a thicker (e.g. 0.2 to 0.5 micron) and more flexible polymer of a lower crosslink density. For example, the layer may be a 50/50 blend of TRPGDA and Henkel 8061.

Paper or film products with excellent abrasion resistance can also be produced by forming the outermost top coating layer of a relatively high crosslink density monomer such as TRPGDA or HDODA. Excellent abrasion resistance with reduced brittleness was observed by blending HDODA with about 10% by weight of lauryl acrylate.

Figure 6A:
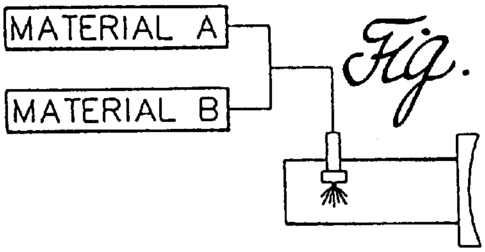
FIGS. 6A to 6C are schematic views of three embodiments of an evaporator apparatus which may be used in the apparatus of FIG. 5.
Figure 6B:
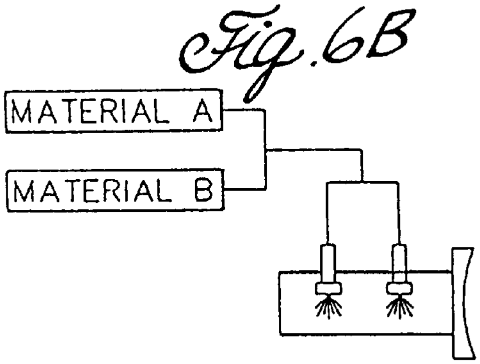
Figure 6C:
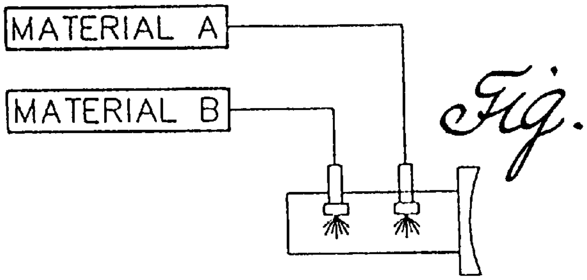

It is frequently desirable to use a blend of monomers that are not readily miscible. Some examples of this are certain acidic acrylate monomers with other acrylate monomers, or fluorinated acrylate monomers with other acrylates. These materials could be mixed in a container, but they tend to separate upon standing. This can result in inconsistencies or nonuniformities in the coating when the components are fed from a container to the evaporator. According to the present invention, immiscible or incompatible acrylate constituents can be fed from separate feed containers, with the separate streams being joined just before the atomizer, and atomized and evaporated together, as shown in FIG. 6A. In an alternate embodiment, the streams can be joined together and atomized from two separate atomizers as shown in FIG. 6B. In still another approach, as shown in FIG. 6C, two separate streams of immiscible or incompatible acrylate materials can be fed from separate feed containers to individual atomizers in the evaporator chamber where the materials are vaporized. The vapors mix in the atomizer chamber and the mixture of acrylate monomers is condensed on the substrate.

The flash evaporation process as described herein can also be used to incorporate additives in an acrylate coating layer. Additives such as UV light stabilizers, UV photoinitiators and UV photosensitizers are often incorporated in radiation curable acrylate compositions. Typically, these additives are simply mixed with the acrylate prepolymer composition. The flash evaporation process and apparatus as illustrated and described herein can be for evaporating such additives by the flash evaporation process without changing their chemistry or degrading them, and depositing them in a vapor deposited radiation curable acrylate composition which can be subsequently cured and crosslinked by exposure to radiation. UV light stabilizers, including UV absorbers, such as benzotriazole compositions and free radical scavengers, such as hindered amines, can be incorporated in an acrylate monomer composition and applied to a substrate by vapor deposition techniques. As an illustrative example, Tinuvin 171 (M.W. 435) and Tinuvin 328 (M.W. 351), made by Ciba Geigy, have each been mixed at a 5% concentration in tripropylene glycol diacrylate, evaporated and condensed onto a substrate and cured by the techniques described herein. Likewise, a hindered amine stabilizer, Irgacor 300 (M.W. 366), also made by Ciba Geigy, has been mixed at a 2% concentration and successfully deposited onto a substrate by these techniques. The flash evaporation techniques can also be used to apply the stabilizer alone to a substrate, such as a polymer film. Where it is desired to produce coating which are cured by UV light rather than by electron beam radiation, UV photoinitiators and acrylate materials can be evaporated, condensed, and cured on a substrate. An advantage of performing this process under vacuum conditions is that it avoids the oxygen inhibition problem that occurs during an air cure. Examples of mixtures of UV photoinitiators and acrylate materials that have been successfully evaporate and cured include a 2% mixture of Darocur 1173 (acetophenone material, MW=164) and 98% polyethylene glycol diacrylate; 2% Irgacure 184 (acetophenone, MW=204) in tripropylene glycol diacrylate.

It is often desirable to increase the cure speed in UV curing. A UV photosensitizer, such as benzophenone (MW=182) or a reactive amine synergist such as Uvecryl P115 made by Radcure, can be evaporated and condensed with a UV curable composition to increase the curing speed by as much as 20% to 100%.

It is found particularly desirable to provide a protective top coat of crosslinked polymer over a deposited layer of metal such as aluminum. If an aluminum layer is applied to a sheet substrate which is rolled for later use or which is passed over a roller contacting the surface, the aluminum may be abraded off of higher asperities on the surface. This is especially true for rough paper and other rough substrates. A sheet coated with aluminum and not protected with an overlying crosslinked polymer coating may have a pinhole density in the order of 1000 pinholes/$cm^2$. If one deposits a prepolymer layer and cures the prepolymer in situ to form a crosslinked polymer layer having a thickness of as little as 0.1 micrometer, the pinhole density through the aluminum layer can be maintained below five pinholes per $cm^2$.

It is often desirable to deposit the prepolymer on the metal layer before the metal layer contacts any solid surface, such as another roll or even the opposite face of a sheet substrate. The prepolymer should, of course, be polymerized before the metal layer contacts any solid surface. The crosslinked polymer has much better abrasion resistance than the metal and avoids damage during handling.

Figure 4A:
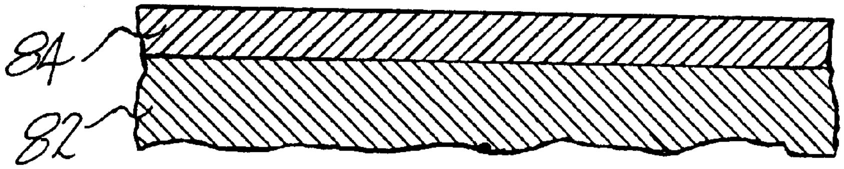
FIGS. 4A and 4B are schematic cross sectional views showing a metal substrate to which a single layer or multilayer acrylic polymer base coating has been applied.
Figure 4B:
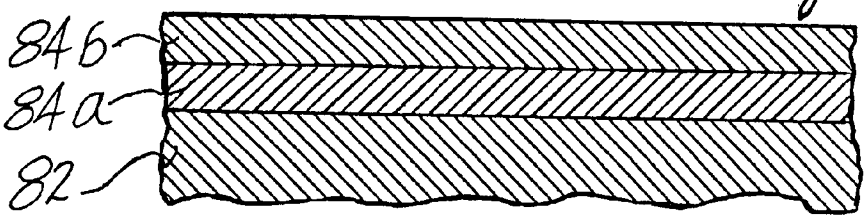

FIG. 4A illustrates a metal substrate 82 to which a cured crosslinked acrylate polymer protective coating 84 has been applied according to the procedures and techniques herein described. FIG. 4B shows the application of a multilayer coating wherein a first crosslinked acrylate coating layer 84*a* is applied to the metal substrate 82 and a second crosslinked acrylate coating layer 84*b* is applied to the first layer 84*a*. The composition of the first layer 84*a* may be tailored for adherence to the metal layer, e.g. by incorporating a polar monomer, and the composition of the second layer 84*b* may be tailored for specific end use properties, e.g. with a high crosslink density for hardness and scratch resistance or with a silicone or fluorine component for release properties.

A number of advantages derive from depositing the prepolymer coating inside the vacuum chamber by evaporation and condensation. When the entire process can be performed in vacuum, it can be essentially continuous by using loading and unloading airlocks or it can be a batch process. When the entire process is performed in vacuum, there is essentially no concern for particulate contamination which may be present when the process is performed in an open environment. In an embodiment where multiple layers of the prepolymer on the substrate, a metal layer on the prepolymer layers, and a top coat of prepolymer on the metal layer may be desired, the alternating layers can be accumulated in vacuum without removing the containers or other substrate from the vacuum chamber.

Many modifications and variations in metallized paper and method for making the same will be apparent to those skilled in the art. For example, the sequence of coating operations and the coated substrate may be varied appreciably. Thus, it will be understood that within the scope of the following claims this invention may be practiced otherwise than as specifically described.

What is claimed is:

1. A sheet material comprising:

a sheet material substrate;

a polymer base coating overlying and adhered to a surface of said sheet material substrate, said base coating comprising a radiation cured crosslinked polymer derived from at least one vapor deposited acrylate prepolymer composition having a molecular weight in the range of from about 150 to 600;

a metal layer deposited on and overlying a surface of said base coating; and a polymer top coating overlying and adhered to a surface of said metal layer, said top coating comprising a radiation cured crosslinked polymer derived from a vapor deposited acrylate prepolymer composition having a molecular weight in the range of from about 150 to 600 and a ratio of its molecular weight to its number of acrylate groups (MW/Ac) in the range of from about 150 to 600, wherein said prepolymer composition for said top coating includes a polar acrylate monomer having a dielectric constant of higher than four.

2. A sheet material according to claim 1 wherein said prepolymer composition for said top coating comprises at least 20% by weight of a polyfunctional acrylate monomer.

3. A sheet material according to claim 1 wherein said polar acrylate monomer comprises an acrylate monomer selected from the group consisting of amine acrylates, acid acrylates, ether acrylates and polyol acrylates.

4. A sheet material according to claim 1, in which the sheet material has fewer than five pinholes per square centimeter of metallized surface.

5. A sheet material according to claim 1, wherein said sheet material substrate is paper, and the sheet material has a 60 degree surface gloss rating of at least 60.

6. A sheet material according to claim 1 wherein said sheet material substrate comprises a polymer film, and the sheet material has a 60 degree surface gloss rating of at least 60.

7. A sheet material according to claim 1 wherein said polymer base coating comprises a first crosslinked acrylate polymer layer overlying and adhered to said surface of said sheet material substrate and a second crosslinked acrylate polymer layer upon which said metal layer is deposited and adhered.

8. A sheet material according to claim 7 wherein said first and second crosslinked polymer layers of said base coating are of the same acrylate composition, and the layers serve to smooth irregularities present in the surface of said substrate.

9. A sheet material according to claim 7 wherein said first and second crosslinked polymer layers of said base coating are of differing acrylate compositions, and said second layer is derived from a vapor deposited acrylate prepolymer composition having a ratio of its molecular weight to its number of acrylate groups (MW/Ac) in the range of from about 150 to 600.

10. A sheet material according to claim 7, wherein said polymer top coating comprises a first crosslinked acrylate polymer layer overlying and adhered to said surface of said metal layer and a second crosslinked acrylate polymer layer forming an exterior surface of the sheet material.

11. A sheet material according to claim 1 wherein said polymer top coating comprises a first crosslinked acrylate polymer layer overlying and adhered to said surface of said metal layer and a second crosslinked acrylate polymer layer forming an exterior surface of the sheet material.

12. A sheet material according to claim 11 wherein said first crosslinked polymer layer is derived from a polyfunctional acrylate monomer and a polar acrylate monomer having a dielectric constant of 4 or higher.

13. A sheet material according to claim 11 wherein said first and second crosslinked polymer layers are of the same or differing acrylate compositions, and said first layer is derived from a polyfunctional acrylate monomer having a ratio of its molecular weight to its number of acrylate groups (MW/Ac) in the range of from about 150 to 600.

14. A sheet material according to claim 13, additionally including a layer of printing adhered to said exterior surface of the sheet material.

15. A sheet material according to claim 11, wherein said second layer which forms the exterior surface of the sheet material has a thickness of 3 microns or less.

16. A sheet material according to claim 11, wherein said substrate is paper, and additionally including a layer of printing adhered to said exterior surface of the sheet material.

17. A sheet material according to claim 1 further comprising a final coating having at least one crosslinked acrylate polymer layer and at least one metal layer, wherein each crosslinked acrylate polymer layer overlies and adheres to the previously deposited metal layer, wherein one of the crosslinked acrylate polymer layers forms an exterior surface of the sheet material and has a thickness of less than 3 microns.

18. A sheet material according to claim 1, wherein said polymer base coating comprises at least one first crosslinked acrylate polymer layer overlying and adhered to said surface of said sheet material substrate and a final crosslinked acrylate polymer layer upon which said metal layer is deposited and adhered.

19. A sheet material according to claim 18, wherein said crosslinked polymer layers of said base coating are of the same acrylate composition, and the layers serve to smooth irregularities present in the surface of said substrate.

20. A sheet material according to claim 1, wherein said polymer base coating comprises a first crosslinked acrylate polymer layer overlying and adhered to said surface of said substrate and a second crosslinked acrylate polymer layer overlying and adhered to said first polymer layer, wherein the first polymer layer has more than one layer of the same composition.

21. A sheet material according to claim 1, wherein at least one of the polymer base coating and the polymer top coating comprises at least one layer of a first crosslinked acrylate polymer and at least one layer of a second crosslinked acrylate polymer, wherein each second crosslinked acrylate polymer layer overlies and adheres to the previously deposited first crosslinked acrylate polymer layer.

22. A metallized paper sheet comprising:

a paper substrate;

a polymer base coating overlying and adhered to a surface of said paper substrate, said base coating comprising at least one layer of radiation cured crosslinked polymer derived from at least one vapor deposited acrylate prepolymer composition having a molecular weight in the range of from about 150 to 600;

a metal layer deposited on and overlying a surface of said base coating;

a polymer top coating overlying and adhered to a surface of said metal layer, said top coating comprising at least one layer of a radiation cured crosslinked polymer derived from a polyfunctional acrylate monomer having a molecular weight in the range of from about 150 to 600 and a polar acrylate monomer having a molecular weight in the range of from about 150 to 600; and said metallized paper sheet having a 60 degree surface gloss rating of at least 60, wherein said polar acrylate monomer has a dielectric constant of higher than four.

23. A metallized paper sheet as recited in claim 22 wherein said at least one layer of crosslinked polymer derived from a polyfunctional acrylate monomer and a polar acrylate monomer is derived from at least 20% by weight of said polyfunctional acrylate monomer, and wherein said polar acrylate monomer comprises an acrylate monomer selected from the group consisting of amine acrylates, acid acrylates, ether acrylates and polyol acrylates.

24. A metallized paper sheet as recited in claim 22 wherein said polymer top coating comprises a first crosslinked acrylate polymer layer overlying and adhered to said surface of said metal layer and a second crosslinked acrylate polymer layer forming an exterior surface of the metallized sheet material, and wherein said first crosslinked acrylate polymer layer is derived from a polyfunctional acrylate monomer and a polar acrylate monomer selected from the group consisting of amine acrylates, acid acrylates, ether acrylates and polyol acrylates, said monomers having a ratio of molecular weight to number of acrylate groups (MW/Ac) within the range of from 150 to 600.

25. A metallized paper sheet comprising:

a paper substrate;

a radiation cured crosslinked polymer base coating adhered to a surface of said substrate, said polymer base coating comprising at least one radiation cured crosslinked acrylate polymer layer, a metal layer deposited on a surface of said radiation cured crosslinked polymer base coating; and a top coating of radiation cured crosslinked polymer overlying said metal layer, said top coating comprising a first radiation cured crosslinked acrylate polymer layer adhered to a surface of said metal layer and a second radiation cured crosslinked acrylate polymer layer adhered to the first polymer layer, and wherein at least said first acrylate polymer layer is derived from a vapor deposited acrylate prepolymer composition having a ratio of molecular weight to number of acrylate groups (MW/Ac) in the range of about 150 to 600 and comprising a polyfunctional acrylate monomer and a polar acrylate monomer selected from the group consisting of amine acrylates, acid acrylates, ether acrylates and polyol acrylates, wherein said polar acrylate monomer has a dielectric constant of higher than four.

26. A sheet material according to claim 25, wherein said second acrylate polymer layer of said top coating is derived from a vapor deposited acrylate prepolymer composition having a ratio of molecular weight to number of acrylate groups (MW/Ac) in the range of about 150 to 600 and comprising a polyfunctional acrylate monomer and a polar acrylate monomer selected from the group consisting of amine acrylates, acid acrylates, ether acrylates and polyol acrylates, and said sheet material additionally includes a layer of printing adhered to said second acrylate polymer layer of said top coating.

27. A sheet material comprising:

a metallic sheet material substrate; and a polymer coating overlying and adhered to a surface of said metallic sheet material substrate, said coating comprising a radiation cured crosslinked polymer derived from a vapor deposited acrylate prepolymer composition having a molecular weight in the range of from about 150 to 600 and a ratio of its molecular weight to its number of acrylate groups (MW/Ac) of in the range of from about 150 to 600, said prepolymer composition comprising at least 20% by weight of a polyfunctional acrylate monomer and a polar acrylate monomer having a dielectric constant of higher than four.

28. A sheet material according to claim 27 wherein said polar acrylate monomer comprises an acrylate monomer selected from the group consisting of amine acrylates, acid acrylates, ether acrylates and polyol acrylates.

29. A sheet material according to claim 27, wherein said polymer is derived from at least 50 percent by weight of said polyfunctional acrylate monomer and at least 10 percent of said polar acrylate monomer.

30. A sheet material according to claim 27, wherein said radiation cured crosslinked polymer has a thickness of 3 microns or less.

31. A sheet material according to claim 27, wherein said polymer coating comprises a first crosslinked acrylate polymer layer overlying and adhered to said surface of said substrate and a second crosslinked acrylate polymer layer overlying and adhered to said first polymer layer.

32. A sheet material according to claim 31 wherein said first and second crosslinked polymer layers of said base coating are of differing acrylate compositions, and said first layer is derived from a vapor deposited acrylate prepolymer composition having a ratio of its molecular weight to its number of acrylate groups (MW/Ac) in the range of from about 150 to 600.

33. A sheet material according to claim 27 wherein said metallic sheet material substrate comprises a metallized paper substrate.

34. A sheet material according to claim 33 wherein said metallized paper substrate comprises a porous paper layer, a polymer base coating overlying and adhered to a surface of said paper layer, said base coating comprising at least one layer of radiation cured crosslinked polymer derived from a vapor deposited acrylate prepolymer composition, and a vapor deposited metal layer adhered to and overlying a surface of said base coating and forming a substantially pinhole-free metal coating.

35. A sheet material according to claim 27 wherein said metallic sheet material substrate comprises a metallized polymer film substrate.

36. A sheet material comprising:

a metallic sheet material substrate;

a polymer coating overlying and adhered to a surface of said sheet material substrate, said coating comprising a first radiation cured crosslinked acrylate polymer layer overlying and adhered to said surface of said sheet material substrate and a second radiation cured crosslinked acrylate polymer layer overlying and adhered to said first crosslinked acrylate polymer layer, said first acrylate polymer layer being derived from a vapor deposited acrylate prepolymer composition having a ratio of its molecular weight to its number of acrylate groups (MW/Ac) in the range of from about 150 to 600, said prepolymer composition comprising a polyfunctional acrylate monomer and a polar acrylate monomer having a dielectric constant of higher than four.

37. A sheet material according to claim 36 wherein said first acrylate polymer layer is derived from at least 20% by weight of said polyfunctional acrylate monomer, and wherein said polar acrylate monomer comprises an acrylate monomer selected from the group consisting of amine acrylates, acid acrylates, ether acrylates and polyol acrylates.

38. A sheet material according to claim 36 wherein said second acrylate polymer layer has a thickness of 3 microns or less and is derived from vapor deposited 100 percent solids monomers and has no residual solvent present.

39. A sheet material according to claim 36 wherein said metallic sheet material substrate comprises metallized paper, and the sheet material has a 60 degree surface gloss rating of at least 60.

40. A sheet material comprising:

a sheet material substrate;

a polymer coating overlying and adhered to a surface of said sheet material substrate, said coating comprising a radiation cured crosslinked polymer derived from at least one vapor deposited acrylate prepolymer composition having a molecular weight in the range of from about 150 to 600, said prepolymer composition comprising a polyfunctional acrylate monomer and a polar acrylate monomer selected from the group consisting of amine acrylates, acid acrylates, ether acrylates and polyol acrylates, wherein said polar acrylate monomer has a dielectric constant of higher than four.

41. A sheet material according to claim 40, wherein said polyfunctional acrylate monomer has a ratio of its molecular weight to its number of acrylate groups (MW/Ac) of at least 150 and less than 600.

42. A sheet material according to claim 40, additionally including a metal layer deposited on and overlying a surface of said polymer coating.

43. A sheet material according to claim 40, wherein said polymer coating comprises a first crosslinked acrylate polymer layer overlying and adhered to said surface of said substrate and a second crosslinked acrylate polymer layer overlying and adhered to said first polymer layer.

44. A sheet material according to claim 43 wherein said first crosslinked polymer layer comprises said polyfunctional acrylate monomer having a ratio of its molecular weight to its number of acrylate groups (MW/Ac) in the range of from about 150 to 600.

45. A sheet material according to claim 43 wherein said first and second crosslinked polymer layers are of the same or differing acrylate compositions, and said second layer comprises said polyfunctional acrylate monomer having a ratio of its molecular weight to its number of acrylate groups (MW/Ac) in the range of from about 150 to 600.

46. A sheet material according to claim 43 additionally including a metal layer deposited on and overlying a surface of said second layer and said sheet material has a 60 degree surface gloss rating of at least 60.

47. A sheet material comprising:

a sheet material substrate;

a polymer coating overlying and adhered to a surface of said sheet material substrate, said coating comprising a first radiation cured crosslinked acrylate polymer layer overlying and adhered to said surface of said sheet material substrate and a second radiation cured crosslinked acrylate polymer layer overlying and adhered to said first crosslinked acrylate polymer layer, said second acrylate polymer layer being derived from a vapor deposited polyfunctional acrylate monomer having molecular weight in the range of from about 150 to 600 and a ratio of its molecular weight to its number of acrylate groups (MW/Ac) in the range of from about 150 to 600 and a vapor deposited polar acrylate monomer having a dielectric constant of higher than four.

48. A sheet material according to claim 47 wherein said second acrylate polymer layer is derived from at least 20% by weight of said polyfunctional acrylate monomer, and wherein said polar acrylate monomer comprises an acrylate monomer selected from the group consisting of amine acrylates, acid acrylates, ether acrylates and polyol acrylates.

49. A sheet material according to claim 47 wherein said second acrylate polymer layer has an acidity equivalent to that provided by at least 10% by weight beta carboxy ethyl acrylate.

50. A sheet material according to claim 47 wherein said second acrylate polymer layer has a thickness of 3 microns or less and is derived from vapor deposited 100 percent solids monomers and has no residual solvent present.

51. A sheet material according to claim 47 wherein said sheet material substrate is paper, and additionally including a metal layer deposited on and overlying a surface of said second layer, and wherein said sheet material has a 60 degree surface gloss rating of at least 60.

* * * * *

UNITED STATES PATENT AND TRADEMARK OFFICE

CERTIFICATE OF CORRECTION

PATENT NO. : 6,218,004 B1
DATED : April 17, 2001
INVENTOR(S) : Shaw, David G.

It is certified that error appears in the above-identified patent and that said Letters Patent is hereby corrected as shown below:

Column 4,
Line 39, "an no"should read -- and no --

Column 5,
Line 62, "the a porous" should read -- the porous --

Column 6,
Line 40, "is may be" should read -- it may be --

Column 16,
Line 25, "Cs." should read -- cS. --

Column 19,
Line 66, "evaporate and" should read -- evaporated and --

Signed and Sealed this

Eighth Day of April, 2003

JAMES E. ROGAN
*Director of the United States Patent and Trademark Office*